United States Patent
Pydin

(10) Patent No.: US 11,025,134 B2
(45) Date of Patent: Jun. 1, 2021

(54) MOTOR AND DUCTED FAN HAVING HEAT RADIATION PORTIONS FOR COOLING MAGNETS

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/516,396

(22) Filed: Jul. 19, 2019

(65) Prior Publication Data
US 2020/0036263 A1 Jan. 30, 2020

(30) Foreign Application Priority Data
Jul. 26, 2018 (JP) .............................. JP2018-140107

(51) Int. Cl.
| | | |
|---|---|---|
| *H02K 9/06* | (2006.01) | |
| *H02K 1/27* | (2006.01) | |
| *H02K 15/03* | (2006.01) | |
| *H02K 21/12* | (2006.01) | |
| *H02K 9/02* | (2006.01) | |
| *H02K 9/24* | (2006.01) | |

(Continued)

(52) U.S. Cl.
CPC .............. *H02K 9/06* (2013.01); *H02K 1/272* (2013.01); *H02K 1/276* (2013.01); *H02K 1/2766* (2013.01); *H02K 9/02* (2013.01); *H02K 9/04* (2013.01); *H02K 9/22* (2013.01); *H02K 9/24* (2013.01); *H02K 15/03* (2013.01); *H02K 21/12* (2013.01)

(58) Field of Classification Search
CPC ............ H02K 1/272; H02K 9/02; H02K 9/04; H02K 9/06; H02K 9/22; H02K 9/24

USPC ........................................ 310/52, 54, 64, 89
See application file for complete search history.

(56) References Cited

U.S. PATENT DOCUMENTS

| | | | | |
|---|---|---|---|---|
| 2012/0112578 A1* | 5/2012 | Telakowski | .............. | H02K 1/32 310/64 |
| 2017/0155292 A1* | 6/2017 | Kimura | ................ | H02K 1/2766 |
| 2019/0280565 A1* | 9/2019 | Kitahara | .................. | H02K 9/20 |

FOREIGN PATENT DOCUMENTS

| | | |
|---|---|---|
| CN | 103229393 | 7/2013 |
| CN | 207677529 | 7/2018 |

(Continued)

OTHER PUBLICATIONS

Chinese Office Action for Chinese Patent Application No. 201910648712.7 dated Dec. 23, 2020.

*Primary Examiner* — Tulsidas C Patel
*Assistant Examiner* — Rashad H Johnson
(74) *Attorney, Agent, or Firm* — Amin, Turocy & Watson, LLP

(57) ABSTRACT

A motor includes: a rotor core which rotates about an axis; a plurality of magnets which extend in an axial direction of the axis inside the rotor core and are disposed in a circumferential direction; a shaft body which is disposed coaxially with the rotor core and has a hollow portion through which a fluid is able to pass from a first side to a second side in the axial direction; and a plurality of heat radiation portions which are disposed along the magnet in the circumferential direction and have a planar portion disposed to be parallel to a side surface of the magnet facing a radial direction, wherein the heat radiation portion extends to be closer to the second side than a second side core end surface located on the second side in the axial direction of the rotor core.

8 Claims, 5 Drawing Sheets

(51) Int. Cl.
*H02K 9/04* (2006.01)
*H02K 9/22* (2006.01)

(56) References Cited

FOREIGN PATENT DOCUMENTS

| | | |
|---|---|---|
| JP | 2007-124805 | 5/2007 |
| JP | 2011-254575 | 12/2011 |
| JP | 2014-023265 | 2/2014 |

* cited by examiner

MOTOR AND DUCTED FAN HAVING HEAT RADIATION PORTIONS FOR COOLING MAGNETS

CROSS-REFERENCE TO RELATED APPLICATION

Priority is claimed on Japanese Patent Application No. 2018-140107, filed on Jul. 26, 2018, the contents of which are incorporated herein by reference.

BACKGROUND

Field of the Invention

The present invention relates to a motor and a ducted fan.

Background

A motor is used as a power source of a ducted fan mounted on an electric aircraft or a multicopter for aerial photography. In the motor, a current is supplied to a coil to thereby form a magnetic field in a stator core, and a magnetic attractive force or repulsive force is generated between a magnet of a rotor and a stator core.

This causes the rotor to rotate with respect to the stator.

It is known that the temperature of the magnet rises due to heat generation due to an eddy current, heat reception from a coil, and the like. The magnet may cause a decrease in magnetic force when the temperature becomes higher than a predetermined temperature. Therefore, various techniques for cooling the magnet have been proposed.

For example, Japanese Unexamined Patent Application, First Publication No. 2007-124805 discloses a configuration of a heat-circulating device which includes a heat pipe disposed at a central region in the radial direction of a rotor and having one end portion exposed to the outside of the rotor, and a heat-radiating means provided on one end portion side of the heat pipe to radiate heat outside the rotor. According to the technique described in Japanese Unexamined Patent Application, First Publication No. 2007-124805, the temperature rise of the rotor can be suppressed by receiving the heat at the heat pipe inside the rotor and by radiating the heat at the heat-radiating means outside the rotor.

SUMMARY

However, in the technique described in the above-mentioned Japanese Unexamined Patent Application, First Publication No. 2007-124805, since the heat pipe is disposed in a radial center region of the rotor, a rotor core is interposed between the heat pipe and the magnet, and there is a possibility of the high-temperature magnet not being able to be cooled effectively. On the other hand, in order to increase the heat radiation efficiency, it is conceivable to radially expand the heat-radiating means exposed to the outside of the rotor. However, when the motor is used in a high-rotation region, a large centrifugal force acts on the motor, and a vibration due to imbalance of weight becomes remarkable. For this reason, the dimension of the heat-radiating means in the radial direction is limited, and there is a risk of high heat radiation efficiency not being able to be obtained.

Therefore, in the technique described in Japanese Unexamined Patent Application, First Publication No. 2007-124805, there was a problem in terms of effective cooling of the magnet and improvement of the heat radiation efficiency.

An object of an aspect of the present invention is to provide a motor and a ducted fan having high cooling performance in which the magnet is effectively cooled and the heat radiation efficiency is improved.

(1) A motor according to an aspect of the present invention includes: a rotor core which rotates about an axis; a plurality of magnets which extend in an axial direction of the axis inside the rotor core and are disposed in a circumferential direction; a shaft body which is disposed coaxially with the rotor core and has a hollow portion through which a fluid is able to pass from a first side to a second side in the axial direction; and a plurality of heat radiation portions which are disposed along the magnet in the circumferential direction and have a planar portion disposed to be parallel to a side surface of the magnet facing a radial direction, wherein the heat radiation portion extends to be closer to the second side than a second side core end surface located on the second side in the axial direction of the rotor core.

(2) In the motor, the rotor core may have a plurality of the magnets arranged along the radial direction from the axis to an outer circumferential portion of the rotor core, and the heat radiation portion may be disposed between the plurality of magnets arranged in the radial direction.

(3) In the motor, at least a part of the heat radiation portion located between the magnets may be formed in a flat plate shape, and at least part of the planar portion may be in contact with the magnet.

(4) In the motor, the heat radiation portion may have a first reduced diameter portion located further inward in the radial direction than the heat radiation portion inside the rotor core and closer to the second side than the second side core end surface.

(5) In the motor, the shaft body may include a collar which supports the first reduced diameter portion of the heat radiation portion.

(6) In the motor, the heat radiation portion may have a second reduced diameter portion located further inward in the radial direction than an inner diameter of the hollow portion and closer to the second side than a second side shaft body end surface located on the second side in the axial direction of the shaft body, and the heat radiation portion may be pivotally supported at the second reduced diameter portion.

(7) In the motor, the heat radiation portion may be formed of a copper.

(8) A ducted fan according to another aspect of the present invention uses the above-described motor.

According to the motor of the configuration of the above (1), a plurality of heat radiation portions are disposed in the circumferential direction along the magnet, and the planar portion is parallel to the side surface facing the radial direction of the magnet. Thus, the heat generated by the magnet is transferred to the heat radiation portion mainly via the planar portion. In this way, since the heat of the magnet is radiated to the outside of the rotor by the heat radiation portion disposed along the magnet, the magnet can be effectively cooled. In addition, since the heat radiation portion can be provided in the vicinity of the magnet, the heat radiation portion can be reduced in size and weight.

Therefore, even in the case in which a plurality of heat radiation portions are disposed in the circumferential direction, the influence of the centrifugal force can be suppressed.

Therefore, while improving the cooling efficiency of the magnet, it is possible to realize a motor capable of being used even in a high-rotation region.

Further, since the heat radiation portion extends to be closer to the second side than the second side core end surface, the heat received from the magnet can be radiated at the extending portion outside the rotor core. Therefore, it is possible to efficiently perform the heat reception of heat generated inside the rotor and the heat radiation to the outside of the rotor with a simple configuration.

Therefore, it is possible to provide the motor having high cooling performance, in which the magnet is effectively cooled and the heat radiation efficiency is improved.

According to the motor of the above configuration (2), since the magnets are disposed side by side in the radial direction, and the heat radiation portion is disposed to be sandwiched between the plurality of magnets, the heat radiation portion can efficiently receive the heat of the plurality of magnets aligned in the radial direction via the side surface of the heat radiation portion on the inner side and the outer side in the radial direction.

Accordingly, it is possible to provide the motor capable of effectively cooling the magnet.

According to the motor of the above configuration (3), since the heat radiation portion has a flat plate shape, and at least one planar portion is in contact with the magnet, the heat of the magnet can be directly transferred to the heat radiation portion without passing through the rotor core. Further, as compared with the case in which the heat radiation member having a circular cross section such as a heat pipe and the magnet are in line contact with each other, by bringing the heat radiation portion and the magnet into surface contact with each other by the planar portion, a wide contact area can be secured. Thus, even when the heat radiation portion is configured using a general metal plate or the like having a thermal conductivity lower than that of the heat pipe, it is possible to exhibit the same cooling performance as the heat pipe. Therefore, high cooling performance can be obtained by an inexpensive and small metal plate or the like.

Therefore, it is possible to provide the motor having high cooling performance, in which the magnet is effectively cooled and the heat radiation efficiency is improved, as compared with the related art.

According to the motor of the above configuration (4), since the heat radiation portion has the first reduced diameter portion, it is possible to reduce the centrifugal force acting on the portion of the heat radiation portion exposed to the outside of the rotor and the vibration due to imbalance, when the motor rotates at a high rotational speed. Therefore, it is possible to realize the high-performance motor in which the influence of the centrifugal force is suppressed.

According to the motor of the configuration of the above (5), the first reduced diameter portion of the heat radiation portion is supported on the collar by the shaft body. In this way, since the heat radiation portion is supported at the first reduced diameter portion which is reduced in diameter toward the inner side in the radial direction of the heat radiation portion and the distance to the shaft body is close, handling for supporting the heat radiation portion is easy, and the assembly of the shaft body and the heat radiation portion can be easily performed. Further, since the first reduced diameter portions in the plurality of heat radiation portions disposed in the circumferential direction are integrated by the collar, it is possible to suppress the vibration or deformation of the heat radiation portion when the motor rotates.

Therefore, it is possible to provide a motor that is easy to assemble.

According to the motor of the above configuration (6), since the second reduced diameter portion is located on the inner side in the radial direction than the inner diameter of the hollow portion, when the fluid passing through the inside of the hollow portion and flowing out of the second shaft body end surface hits the second reduced diameter portion, the heat radiation portion is cooled. Thus, the heat received by the magnet can be efficiently radiated.

Therefore, it is possible to realize a motor having high cooling performance with improved heat radiation efficiency.

According to the motor of the above configuration (7), since the heat radiation portion is configured by copper having higher heat conductivity than those of other metals, the circulation efficiency of heat can be improved and high cooling performance can be obtained. In addition, since copper is inexpensive and easy to process, the manufacturing cost of the heat radiation portion can be reduced.

Therefore, a motor with excellent productivity can be realized.

According to the ducted fan of the configuration of the above (8), it is possible to realize a ducted fan equipped with a motor having high cooling performance, in which the magnet is effectively cooled and the heat radiation efficiency is improved.

DESCRIPTION OF THE EMBODIMENTS

Hereinafter, embodiments of the present invention will be described with reference to the drawings.
(Ducted Fan)

Figure 1:
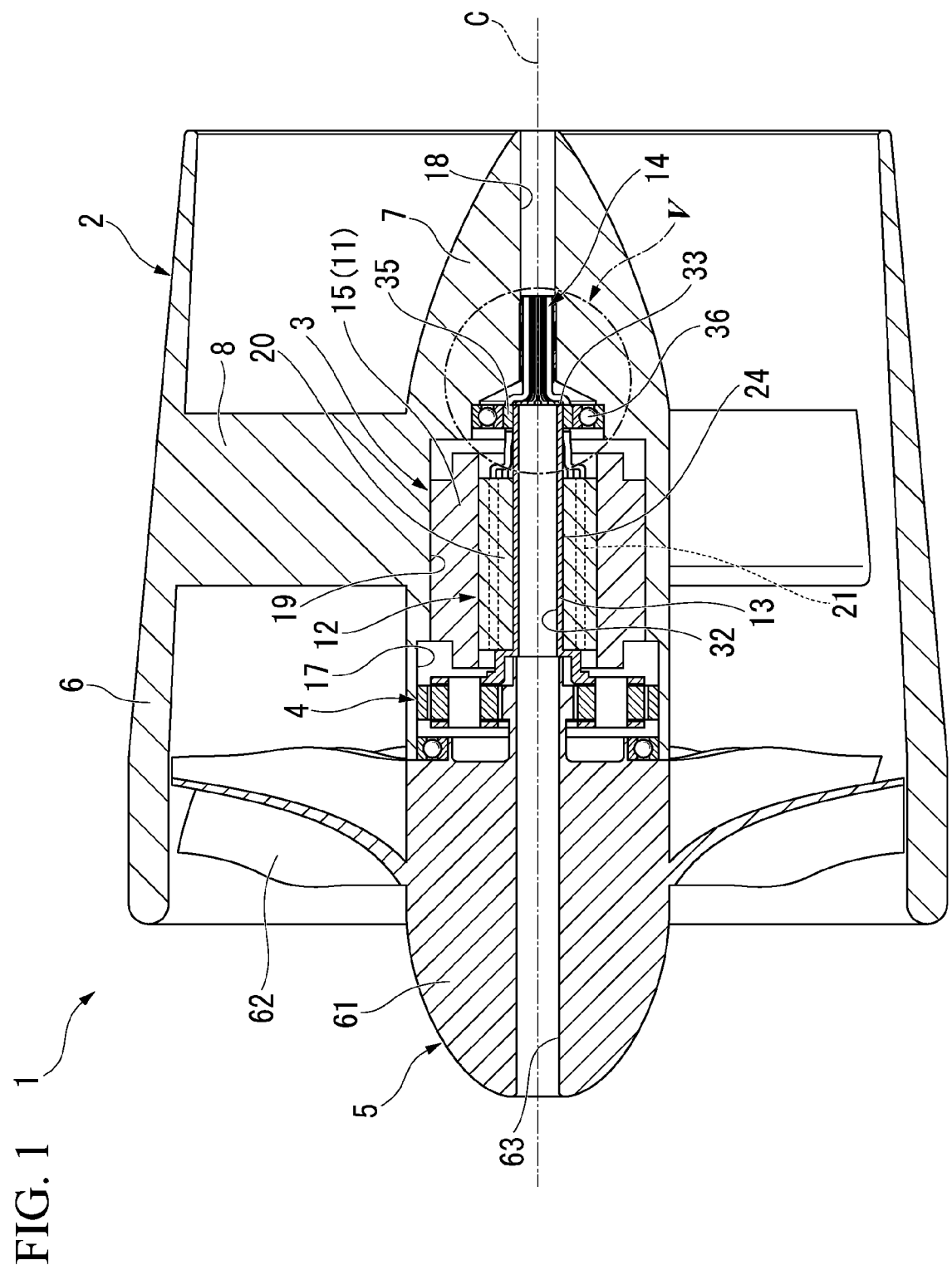
FIG. 1 is a cross-sectional view of a ducted fan according to an embodiment.

FIG. 1 is a cross-sectional view of a ducted fan 1 according to an embodiment.

The ducted fan 1 includes a housing 2, a motor 3, a planetary gear mechanism 4, and a fan rotor 5.

The housing 2 is in the form of a cylinder disposed coaxially with an axis C.

In the following description, in some cases, a direction along the axis C of the housing 2 is referred to as an axial direction, a direction orthogonal to the axis C is referred to as a radial direction, and a direction around the axis C is referred to as a circumferential direction.

The housing 2 has a cylinder body 6, a central body 7, and connection bodies 8.

The cylinder body 6 is formed in a cylindrical shape centering on the axis C. The diameter of the cylinder body 6 is formed to decrease from a first side (a left side in the drawing) to a second side (a right side in the drawing) in the axial direction.

The central body 7 is disposed coaxially with the axis C. The central body 7 and the cylinder body 6 are disposed at an interval in the radial direction. The central body 7 internally has a gear accommodation portion 17, a circulation hole 18, and a motor accommodation portion 19. The gear accommodation portion 17 is provided in a central region in the radial direction of the central body 7, to be closer to the first side in the axial direction than the connection bodies 8 to be described later. The circulation hole 18 is formed to be closer to the second side in the axial direction than the connection bodies 8 coaxially with the axis C. The motor accommodation portion 19 is provided in the central region in the radial direction of the central body 7 between the gear accommodation portion 17 and the circulation hole 18 in the axial direction.

The connection bodies 8 radially extend between the cylinder body 6 and the central body 7. The connection bodies 8 connect the cylinder body 6 and the central body 7. The plurality of connection bodies 8 are provided at intervals in the circumferential direction.

(Motor)

The motor 3 is disposed inside the motor accommodation portion 19 of the housing 2. The motor 3 is a so-called IPM motor having magnets 21 inside the rotor 12. The motor 3 includes a stator 11, a rotor 12, a shaft body 13, and heat radiation portions 14.

The stator 11 includes a stator core 15 and a coil (not illustrated).

The stator core 15 is formed in an annular shape centered on the axis C. An outer circumferential portion of the stator core 15 is fixed to the housing 2. A coil (not illustrated) is wound and fixed to a slot (not illustrated) of the stator core 15.

Figure 2:
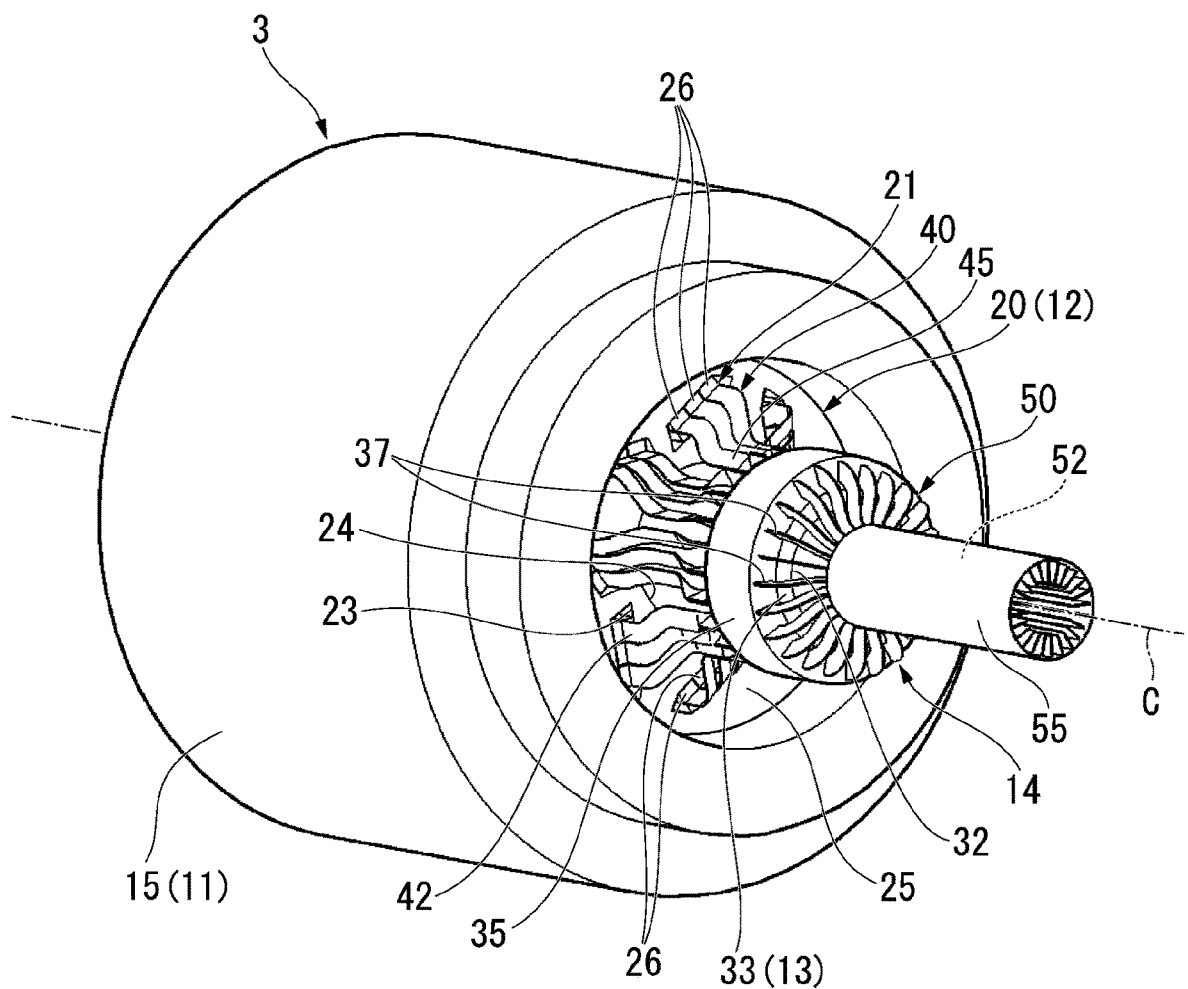
FIG. 2 is a perspective view of a motor from a second side in an axial direction according to the embodiment.

FIG. 2 is a perspective view of the motor 3 from the second side in the axial direction.

The rotor 12 includes a rotor core 20 and the magnets 21.

The rotor core 20 is disposed inside the stator core 15 at an interval from the stator core 15. The rotor core 20 is formed in an annular shape coaxial with the axis C, and is configured to be rotatable about the axis C relative to the stator core 15. The rotor core 20 has magnet-holding holes 23, a shaft body-holding hole 24 (see FIG. 1), and a second side core end surface 25.

The magnet-holding holes 23 penetrate the inside of the rotor core 20 in the axial direction. The plurality of (eight in the present embodiment) magnet-holding holes 23 are formed in the circumferential direction.

The shaft body-holding hole 24 penetrates the rotor core 20 in the axial direction to be coaxial with the axis C.

The second side core end surface 25 is located on the second side in the axial direction of the rotor core 20.

The magnets 21 are disposed inside the magnet-holding holes 23 and extend in the axial direction. The magnets 21 have a plurality of single magnets 26 aligned in the radial direction from the axis C to the outer circumferential portion of the rotor core 20. Specifically, the magnets 21 are configured of a total of six single magnets 26 aligned in three lines in the circumferential direction and in two lines in the radial direction. The plurality of (eight in the present embodiment) magnets 21 are disposed in the circumferential direction in a state in which the six single magnets 26 are joined together. The plurality of magnets 21 are accommodated in the magnet-holding holes 23.

The shaft body 13 (see FIG. 1) is disposed inside the shaft body-holding hole 24. The shaft body 13 is fixed to the rotor core 20 in a non-rotatable manner. A hollow portion 32 is formed inside the shaft body 13. The hollow portion 32 penetrates the shaft body 13 in the axial direction. Inside the hollow portion 32, fluid can pass from the first side to the second side in the axial direction. The end surface located on the second side in the axial direction of the shaft body 13 is a second side shaft body end surface 33.

The shaft body 13 has a collar 35 and a bearing 36 (see FIG. 1) on the outer circumferential portion on the second side in the axial direction.

The collar 35 is fixed to the shaft body 13. A plurality of slits 37 penetrating in the axial direction and aligned in the circumferential direction are formed on the collar 35. The end surface of the collar 35 and the second side shaft body end surface 33 are flush with each other.

Figure 5:
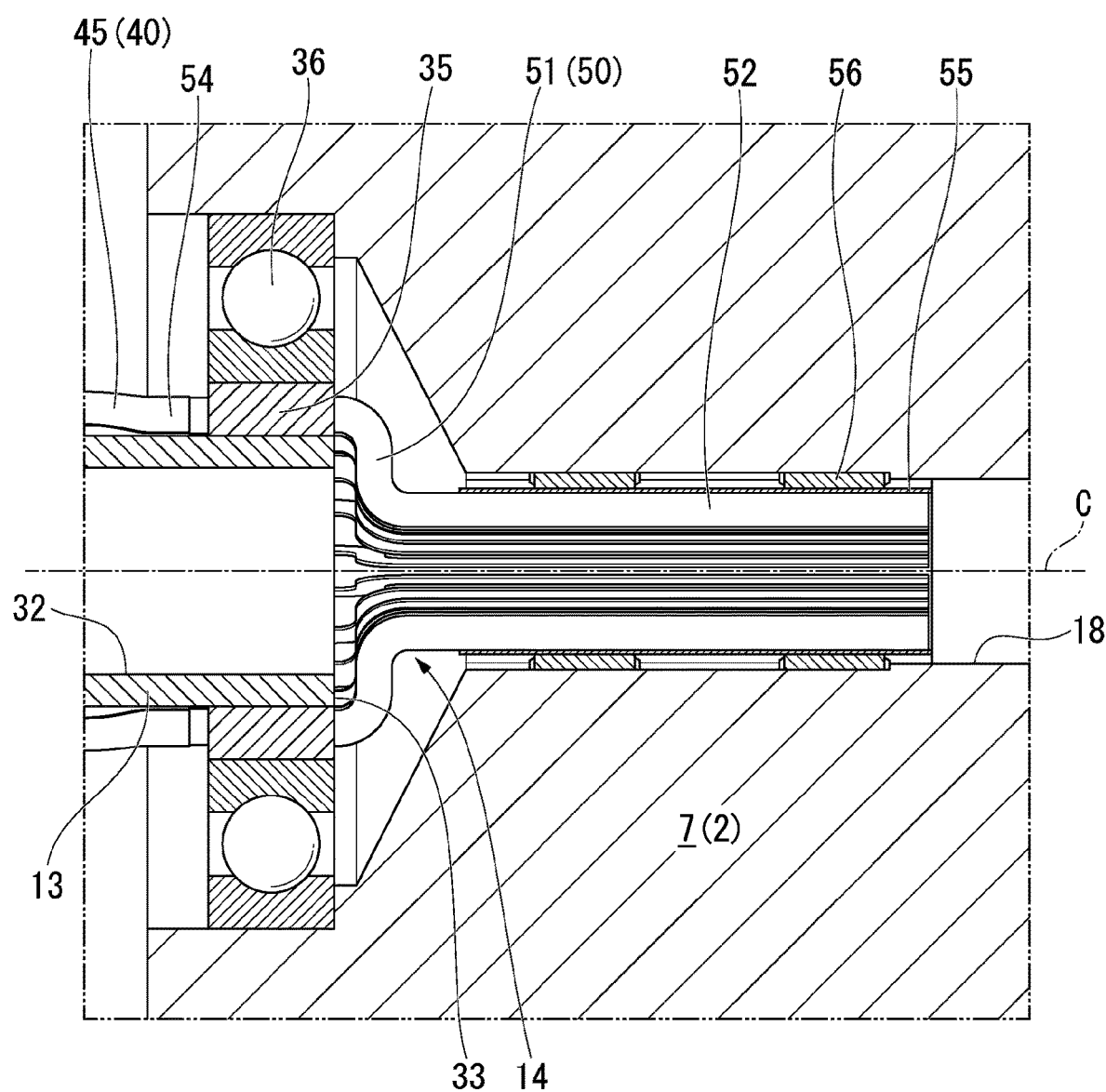
FIG. 5 is an enlarged view of a part V of FIG. 1 according to the embodiment.

An inner ring of the bearing 36 is fixed to the outer circumferential portion of the collar 35 (see also FIG. 5). An outer ring of the bearing 36 is fixed to the housing 2. The end surface of the bearing 36 and the end surface of the collar 35 are flush with each other.

(Heat Radiation Portion)

Figure 3:
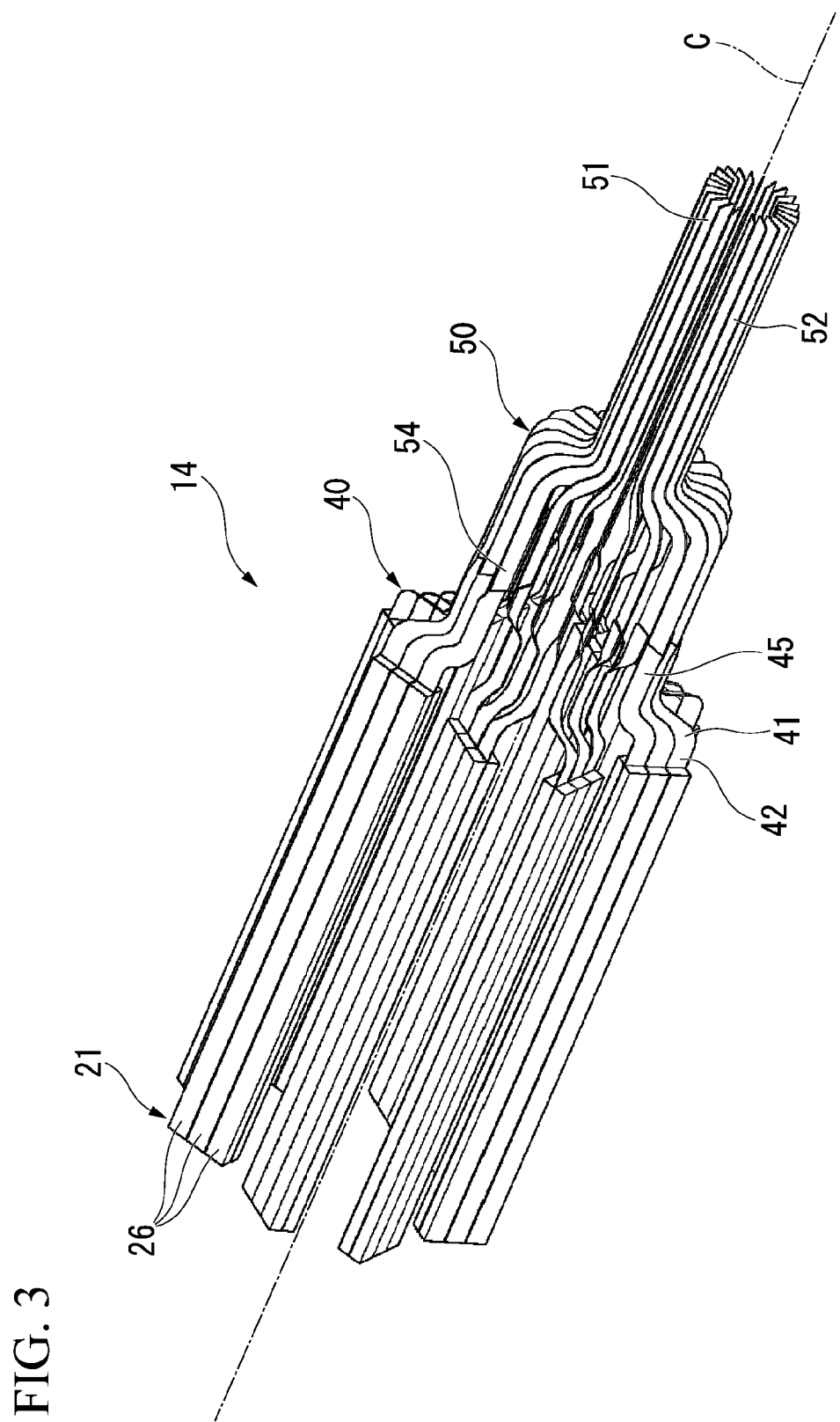
FIG. 3 is a perspective view of a heat radiation portion according to the embodiment.

FIG. 3 is a perspective view of the heat radiation portions 14.

Figure 4:
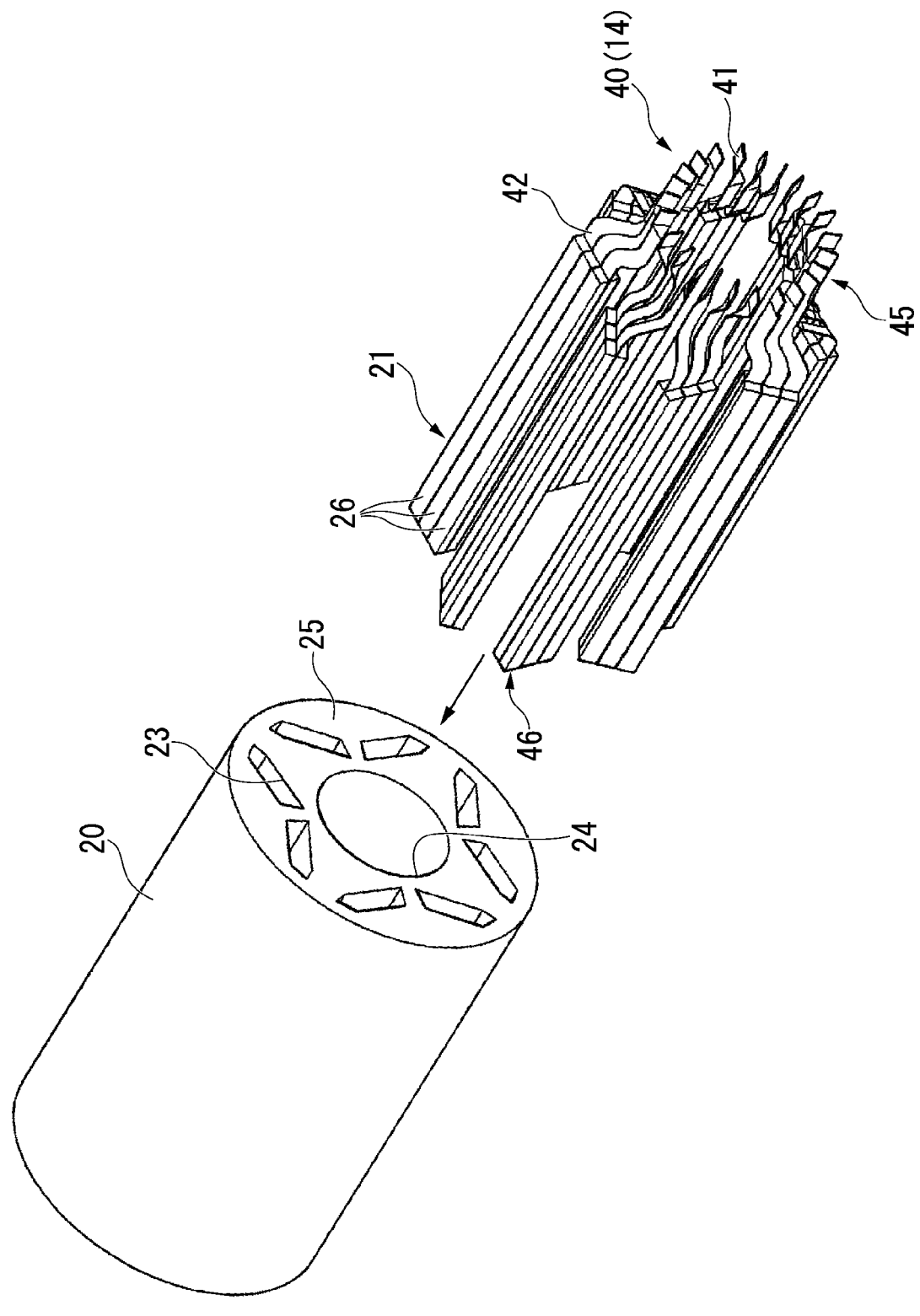
FIG. 4 is an explanatory view illustrating an installation process of a first heat radiation portion according to the embodiment.

The heat radiation portions 14 include a first heat radiation portion 40 and a second heat radiation portion 50. FIG. 4 is an explanatory view illustrating an installation process of installing the first heat radiation portion 40 on the rotor core 20. Some of the components are omitted for explanation.

The first heat radiation portion 40 is constituted by a plurality of first copper wires 41 extending in the axial direction. The first copper wires 41 are formed by bending flat plate-like copper plates. Specifically, the first copper wires 41 are formed to be twisted so that the side surfaces of the first copper wires 41 located on the first side in the axial direction substantially face the radial direction, and the side surfaces of the first copper wires 41 located on the second side in the axial direction face the circumferential direction.

The first heat radiation portion 40 has a configuration in which the plurality of first copper wires 41 formed in this manner continue in the circumferential direction. The portions of the first copper wires 41 located on the first side in the axial direction are each disposed between the single magnets 26 aligned in the radial direction.

The first heat radiation portion 40 has planar portions 42 and first reduced diameter portions 45.

The plurality of planar portions 42 are disposed in the circumferential direction along the magnets 21, and are disposed to be parallel to the side surfaces of the magnets 21 facing the radial direction. The planar portions 42 are disposed between the plurality of magnets 21 aligned in the radial direction inside the rotor core 20, and at least parts of the planar portions 42 are in contact with the magnets 21. In the present embodiment, the first heat radiation portion 40 has the planar portions 42 on each of a back surface and a front surface, and both planar portions 42 are in contact with the magnets 21 from the outer side and the inner side in the radial direction, respectively.

The first reduced diameter portions 45 extend to be closer to the second side than the second side core end surface 25 of the rotor core 20. The first reduced diameter portions 45 are located further inward in the radial direction than the first heat radiation portion 40 (the planar portions 42) located inside the rotor core 20.

An installation method of the first heat radiation portion 40 will be described. As illustrated in FIG. 4, first, magnet units 46 are manufactured in a state in which the single magnets 26 are each joined to the planar portions 42, and the single magnets 26 adjacent to each other in the circumferential direction are further joined. Next, when the magnet units 46 are inserted into the magnet-holding holes 23 of the rotor core 20, the first heat radiation portion 40 is installed on the rotor core 20. The plurality of (eight in the present embodiment) magnet units 46 are disposed in the circumferential direction.

Returning to FIG. 3, the second heat radiation portion 50 is configured by a plurality of second copper wires 51 extending in the axial direction. The second copper wires 51 are formed in flat plate shapes by punching or the like. Each of the second copper wires 51 is disposed to line up in the circumferential direction so that the side surface faces the circumferential direction. The second copper wires 51 are provided in the same number as that of the first copper wires 41.

As illustrated in FIGS. 2 and 3, the second heat radiation portion 50 has a configuration in which the plurality of second copper wires 51 formed in this way continue in the circumferential direction.

The second heat radiation portion 50 has a second reduced diameter portion 52, a welding portion 54, a cylinder member 55, and a needle bearing 56 (see FIG. 5). The second heat radiation portion 50 is inserted into the slits 37 formed in the collar 35 of the shaft body 13 and is fixed to the shaft body 13.

FIG. 5 is an enlarged view of a part V of FIG. 1.

The second reduced diameter portion 52 extends to the second side in the axial direction of the second heat radiation portion 50. The second reduced diameter portion 52 is located on the second side from the second side shaft body end surface 33 located on the second side in the axial direction of the shaft body 13, and further inward in the radial direction than the inner diameter of the hollow portion 32.

The welding portion 54 is provided at the first side end portion in the axial direction of the second heat radiation portion 50. The welding portion 54 is welded to the second side end portion in the axial direction of the first reduced diameter portions 45 in the first heat radiation portion 40. Therefore, the first reduced diameter portions 45 are supported by the collar 35 of the shaft body 13 via the welding portion 54.

The cylinder member 55 is formed of carbon. The cylinder member 55 is formed in a thin-walled cylindrical shape disposed coaxially with the axis C. The cylinder member 55 covers the outer circumference of the second reduced diameter portion 52.

The cylinder member 55 may be made of a material other than carbon, such as a metal or resin.

The needle bearing 56 is disposed coaxially with the axis C. The inner ring of the needle bearing 56 is fixed to the outer circumferential portion of the cylinder member 55. The outer ring of the needle bearing 56 is fixed to the housing 2. In other words, the second heat radiation portion 50 is pivotally supported by the housing 2 via the needle bearing 56 at the second reduced diameter portion 52.

The installation method of the second heat radiation portion 50 will be described. In the state before the installation of the second heat radiation portion 50, the magnet units 46 (the magnets 21 and the first heat radiation portion 40) and the shaft body 13 are disposed in the rotor core 20. The collar 35 is fixed to the shaft body 13.

In the installation process of the second heat radiation portion 50, first, the second copper wires 51 of the second heat radiation portion 50 are each inserted into the collar 35 from the second side in the axial direction. Next, the welding portion 54 protruding to the first side of the collar 35 is fixed to the first reduced diameter portions 45 of the first heat radiation portion 40 by point welding. Next, when the cylinder member 55 and the needle bearing 56 are attached to the second reduced diameter portion 52, the second heat radiation portion 50 is installed.

The second heat radiation portion 50 to which the cylinder member 55 and the needle bearing 56 are attached in advance may be inserted into the collar 35.

According to the above-described configuration, the rotor 12, the shaft body 13 and the heat radiation portions 14 are configured to be integrally rotatable with respect to the stator 11 around the axis C inside the motor 3.

Returning to FIG. 1, the planetary gear mechanism 4 is disposed inside the gear accommodation portion 17 of the housing 2. The planetary gear mechanism 4 meshes with a gear mechanism (not illustrated) which the shaft body 13 of the motor 3 and the fan rotor 5 each have. In the planetary gear mechanism 4, the rotation of the shaft body 13 is input, and the rotational speed is increased and output to the fan rotor 5.

The fan rotor 5 is disposed on the inner side in the radial direction of the cylinder body 6 of the housing 2 closer to the first side in the axial direction than the central body 7. The fan rotor 5 has a fan rotor main body 61 and blade bodies 62.

The fan rotor main body 61 is disposed coaxially with the axis C, and is connected to the planetary gear mechanism 4 via a gear mechanism (not illustrated). A part of the fan rotor main body 61 protrudes to be closer to the first side than the first side end portion in the axial direction of the cylinder body 6. A fan rotor hollow portion 63 is formed inside the fan rotor main body 61. The fan rotor hollow portion 63 axially penetrates the fan rotor main body 61 to be coaxial with the axis C.

The blade bodies 62 protrude radially outward from the fan rotor main body 61. The blade bodies 62 are located inside the cylinder body 6. The plurality of blade bodies 62 are provided at intervals in the circumferential direction.

The blade bodies 62 are formed integrally with the fan rotor main body 61.

(Operation and Effect)

Next, the operation and effect of the ducted fan 1 and the motor 3 will be described.

When the rotor 12 rotates with respect to the stator 11, the fan rotor 5 rotates in conjunction with the rotor 12. When the fan rotor 5 rotates, the blade bodies 62 push the external air backward (toward the second side in the axial direction, and the right side in FIG. 1), thereby generating a thrust facing forward (the first side in the axial direction, and the left side in FIG. 1) in the ducted fan 1. In addition, when the ducted fan 1 moves forward, the external air flows into the fan rotor hollow portion 63. The external air having flowed into the fan rotor hollow portion 63 passes through the hollow portion 32 of the shaft body 13, the inside of the second reduced diameter portion 52, and the circulation hole 18 of the housing 2 in that order, and is discharged from the rear of the ducted fan 1.

Through the above-described operation, the ducted fan 1 can obtain a forward thrust, and can move the device equipped with the ducted fan 1 forward.

On the other hand, by the rotation of the rotor 12, the heat generated by the magnets 21 serving as a heat generation element inside the rotor 12 is transferred to the first heat radiation portion 40 via the planar portions 42. The heat received by the planar portions 42 is transferred through the inside of the first heat radiation portion 40 and moves to the first reduced diameter portions 45 located outside the rotor 12. The first reduced diameter portions 45 are cooled by being exposed to the outside of the rotor 12 that is lower in temperature than the inside of the rotor 12, and radiate the heat received by the planar portions 42 to the outside of the rotor 12. At this time, since the first heat radiation portion 40 is formed of a plurality of flat plate-like copper wires 41, heat is effectively radiated by the external air passing between the respective first copper wires 41, and the magnets 21 are cooled.

The heat radiation effect of the heat radiation portions 14 will be described in comparison with the heat pipe. Assuming that a thermal conductivity is k, a temperature difference is ΔT, an area of the flat plate is A, a thickness is L, and a thermal resistivity is R, a heat transfer amount Q of the flat plate is expressed by the following formula.

$$Q=k \times \Delta T/L \times A = \Delta T/R \quad (1)$$

In general, a heat pipe having a small thermal resistance is easily used to cool the rotor 12. The smaller the thermal resistivity, the better, and the heat pipe has a thermal resistivity of about one-hundredth that of a copper plate.

However, when the heat radiation portions 14 are configured to be in contact with the magnets 21, the heat pipe has a cylindrical shape and thus makes linear contact with the magnets 21, whereas the heat radiation portions 14 have the planar portions 42 and thus make surface contact with the magnets 21. Therefore, the heat radiation portions 14 in this embodiment can ensure a wide contact area compared with the heat pipe, and can make the heat transfer amount larger than that of the magnets 21. Therefore, even with the heat radiation portions 14 formed of metal plates or the like having a thermal conductivity lower than that of the heat pipe, it is possible to exhibit the same cooling performance as the heat pipe.

The heat received by the first heat radiation portion 40 is transferred to the second heat radiation portion 50 via the welding portion 54.

The heat received by the welding portion 54 is transferred through the inside of the second heat radiation portion 50, and moves to the second reduced diameter portion 52 located on the inner side in the radial direction of the shaft body 13. Since the external air having flowed in from the fan rotor hollow portion 63 flows into the second reduced diameter portion 52, the second reduced diameter portion 52 is cooled by being exposed to the external air that is accelerated by passing through the hollow portion 32. Moreover, since the second heat radiation portion 50 is configured by the plurality of flat plate-like second copper wires 51, when the external air passes between the respective second copper wires 51, the heat radiation is performed effectively.

According to the motor 3 of the present embodiment, the plurality of heat radiation portions 14 are disposed in the circumferential direction along the magnets 21, and the planar portions 42 are parallel to the side surfaces facing the radial direction of the magnets 21. Thus, the heat generated by the magnets 21 is transferred to the heat radiation portions 14 mainly via the planar portions 42. In this way, since the heat of the magnets 21 is radiated to the outside of the rotor 12 by the heat radiation portions 14 disposed along the magnets 21, the magnets 21 can be effectively cooled. In addition, since the heat radiation portions 14 can be provided in the vicinity of the magnets 21, the heat radiation portions 14 can be reduced in size and weight. Therefore, even in the case in which the plurality of heat radiation portions 14 are disposed in the circumferential direction, the influence of the centrifugal force can be suppressed. Therefore, while improving the cooling efficiency of the magnets 21, the motor 3 can be used even in a high-rotation region.

Further, since the heat radiation portions 14 extend to be closer to the second side than the second side core end surface 25, the heat received from the magnets 21 can be radiated at the extending portion outside the rotor core 20. Therefore, it is possible to efficiently perform the heat reception of heat generated inside the rotor 12 and the heat radiation to the outside of the rotor 12 with a simple configuration.

Therefore, it is possible to provide the motor 3 having high cooling performance, in which the magnets 21 are effectively cooled and the heat radiation efficiency is improved.

In addition, since the magnets 21 are disposed side by side in the radial direction, and the heat radiation portions 14 are disposed to be sandwiched between the plurality of magnets 21, the heat radiation portions 14 can efficiently receive the heat of the plurality of magnets 21 aligned in the radial direction via the side surface (the planar portions 42) of the heat radiation portions 14 on the inner side and the outer side in the radial direction.

Accordingly, it is possible to provide the motor 3 capable of effectively cooling the magnets 21.

Further, since the heat radiation portions 14 have flat plate shapes, and at least one planar portion 42 is in contact with the magnets 21, the heat of the magnets 21 can be directly transferred to the heat radiation portions 14 without passing through the rotor core 20. Further, as compared with the case in which the heat radiation member and the magnets 21 are in line contact with each other by the heat radiation member having a circular cross section such as a heat pipe, by bringing the heat radiation portions 14 and the magnets 21 into surface contact with each other by the planar portions 42, a wide contact area with the magnets 21 can be secured. Thus, even when the heat radiation portions 14 are configured using general metal plates or the like having a thermal conductivity lower than that of the heat pipe, it is possible to exhibit the same cooling performance as the heat pipe. Therefore, high cooling performance can be obtained by an inexpensive and small metal plate or the like.

Therefore, it is possible to provide the motor 3 having high cooling performance, in which the magnets 21 are effectively cooled and the heat radiation efficiency is improved, as compared with the related art.

According to the motor 3 of the present embodiment, since the heat radiation portions 14 have the first reduced diameter portions 45, it is possible to reduce the centrifugal force acting on the portion exposed to the outside of the rotor 12 of the heat radiation portion 14 and the vibration due to imbalance when the motor 3 rotates at a high rotational speed. Therefore, it is possible to realize the motor 3 having high performance in which the influence of the centrifugal force is suppressed.

In addition, the first reduced diameter portions 45 of the heat radiation portions 14 are supported on the collar 35 by the shaft body 13. In this way, since the heat radiation portions 14 are supported at the first reduced diameter portions 45 which are reduced in diameter toward the inner side in the radial direction of the heat radiation portions 14 and the distance to the shaft body is close, handling for supporting the heat radiation portions 14 is easy, and the assembly of the shaft body 13 and the heat radiation portions 14 can be easily performed. Further, since the first reduced diameter portions 45 in the plurality of heat radiation portions 14 disposed in the circumferential direction are integrated by the collar 35, it is possible to suppress the vibration or deformation of the heat radiation portions 14 when the motor 3 rotates.

Therefore, it is possible to provide the motor 3 that is easy to assemble.

Since the second reduced diameter portion 52 is located on the inner side in the radial direction than the inner diameter of the hollow portion 32, when the fluid passing through the inside of the hollow portion 32 and flowing out of the second side shaft body end surface 33 hits the second reduced diameter portion 52, the heat radiation portions 14 are cooled. Thus, the heat received by the magnets 21 can be efficiently radiated.

Therefore, it is possible to realize the motor 3 having high cooling performance with improved heat radiation efficiency.

Moreover, since the heat radiation portions 14 are configured by copper having higher heat conductivity than those of other metals, the circulation efficiency of heat can be improved and high cooling performance can be obtained. In addition, since copper is inexpensive and easy to process, the manufacturing cost of the heat radiation portions 14 can be reduced.

Therefore, the motor 3 excellent in productivity can be realized.

According to the configuration of the present embodiment, it is possible to realize the ducted fan 1 equipped with the motor 3 having high cooling performance, in which the magnets 21 are effectively cooled and the heat radiation efficiency is improved.

The technical scope of the present invention is not limited to the above-described embodiment, and various modifications can be made without departing from the scope of the present invention.

For example, in the present embodiment, six single magnets 26 are disposed inside the magnet-holding holes 23, but the present invention is not limited thereto. The arrangement and number of single magnets 26 can be changed as appropriate.

Also, one undivided magnet may be provided.

In addition, an adhesive resin or the like may be interposed between the magnets 21 and the heat radiation portion 14. That is, a configuration in which the magnets 21 and the heat radiation portion 14 are disposed in proximity to each other may be provided.

The bearing for pivotally supporting the second reduced diameter portion 52 may not be the needle bearing 56. However, as compared with the case in which a normal bearing is used, when the needle bearing 56 is used, there is an excellent effect of being able to reduce swelling that impedes the flow of fluid.

In addition, it is possible to replace constituent elements in the above-described embodiment with known constituent elements as appropriate without departing from the scope of the present invention, and the above-described respective modified examples may be combined as appropriate.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A motor, comprising:
a rotor core which rotates about an axis;
a plurality of magnets which extend in an axial direction of the axis inside the rotor core and are disposed in a circumferential direction;
a shaft body which is disposed coaxially with the rotor core and has a hollow portion through which a fluid is able to pass from a first side to a second side in the axial direction; and
a plurality of heat radiation portions which are disposed along the magnet in the circumferential direction and have a planar portion disposed to be parallel to a side surface of the magnet facing a radial direction,
wherein the heat radiation portion extends in a direction from the first side to the second side in the axial direction beyond a second side core end surface located on the second side in the axial direction of the rotor core.

2. The motor according to claim 1,
wherein the rotor core has a plurality of the magnets arranged along the radial direction from the axis to an outer circumferential portion of the rotor core, and
the heat radiation portion is disposed between the plurality of magnets arranged in the radial direction.

3. The motor according to claim 2,
wherein at least a part of the heat radiation portion located between the magnets is formed in a flat plate shape, and at least part of the planar portion is in contact with the magnet.

4. The motor according to claim 1,
wherein the heat radiation portion has a first reduced diameter portion located further inward in the radial direction than the heat radiation portion inside the rotor core and beyond the second side core end surface.

5. The motor according to claim 4,
wherein the shaft body includes a collar which supports the first reduced diameter portion of the heat radiation portion.

6. The motor according to claim 1,
wherein the heat radiation portion has a second reduced diameter portion located further inward in the radial direction than an inner diameter of the hollow portion and beyond a second side shaft body end surface located on the second side in the axial direction of the shaft body, and
the heat radiation portion is pivotally supported at the second reduced diameter portion.

7. The motor according to claim 1, wherein the heat radiation portion is formed of a copper.

8. A ducted fan using the motor according to claim 1.

* * * * *